2 Sheets--Sheet 1.

W. S. FINLEY.
Improvement in Board-Measuring Machines.
No. 130,120. Patented Aug. 6, 1872.

WITNESSES:	INVENTOR:

AM. PHOTO-LITHOGRAPHIC CO. N.Y. (OSBORNE'S PROCESS)

W. S. FINLEY.
Improvement in Board-Measuring Machines.
No. 130,120. Patented Aug. 6, 1872.
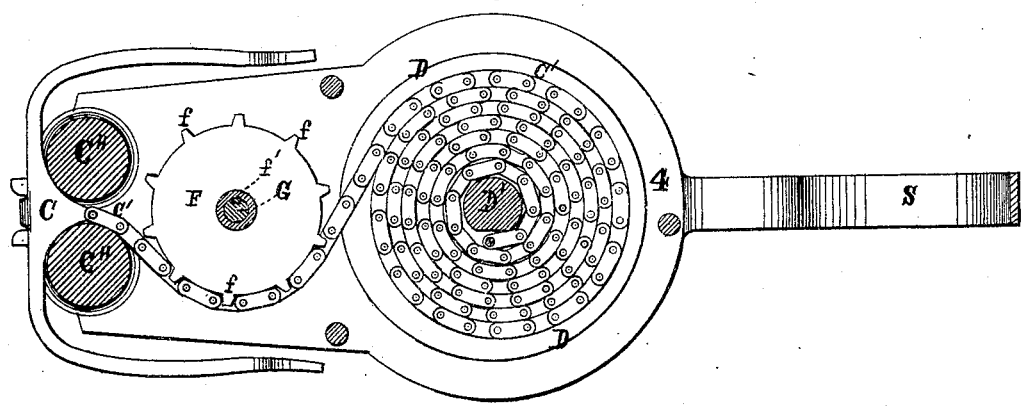
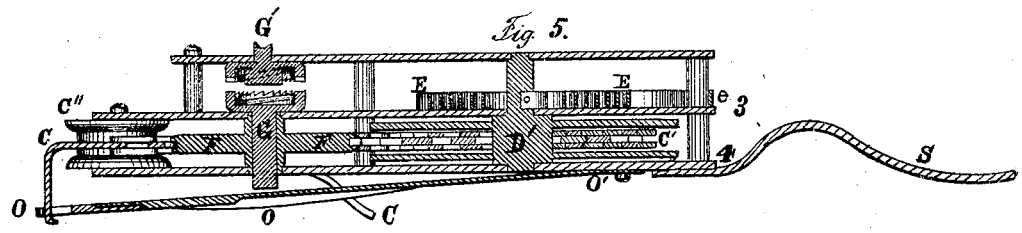
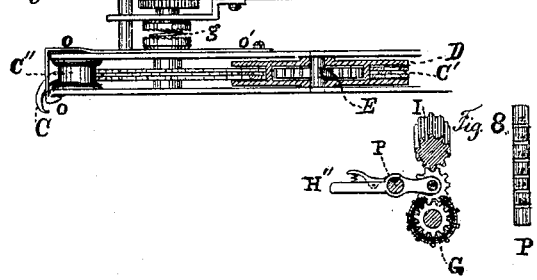
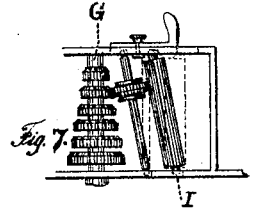
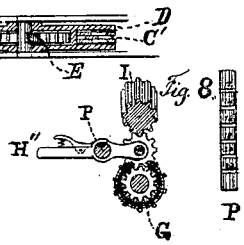
WITNESSES:
INVENTOR:

UNITED STATES PATENT OFFICE.

WILLIAM S. FINLEY, OF FOND DU LAC, WISCONSIN.

IMPROVEMENT IN BOARD-MEASURING MACHINES.

Specification forming part of Letters Patent No. 130,120, dated August 6, 1872.

*To all whom it may concern:*

Be it known that I, WILLIAM S. FINLEY, of Fond du Lac, Fond du Lac county, State of Wisconsin, have invented a new and Improved Board-Measuring Machine, for measuring boards; and I declare the following to be a full, clear, and exact description of the same, such as will enable others skilled in the art to which it pertains to make and use it, reference being had to the accompanying drawing which forms a part of these specifications.

My invention relates to a board-measuring machine, so made as to be susceptible of use by a person of ordinary ability—as a small boy or a common laborer—in tallying lumber correctly.

Figure 1:
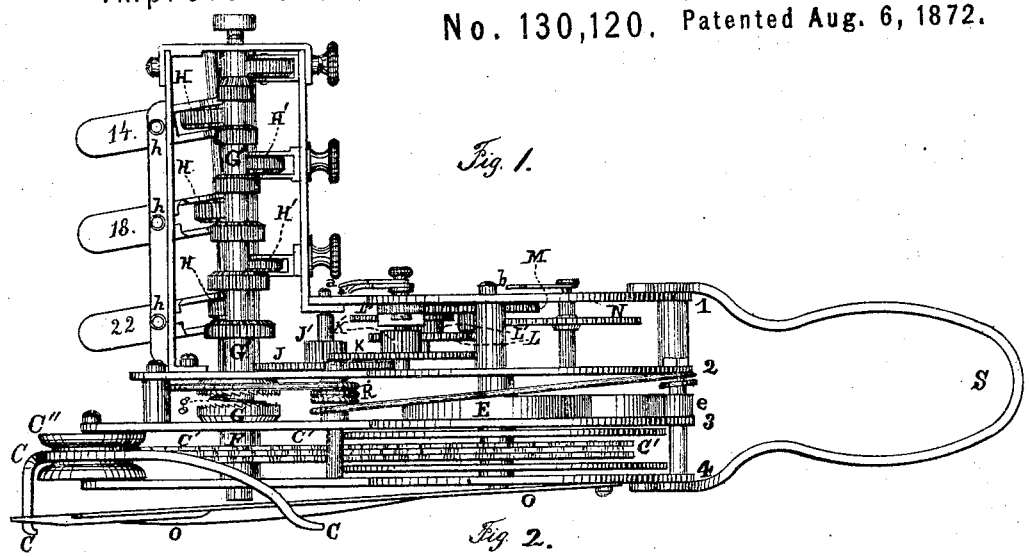
Figure 2:
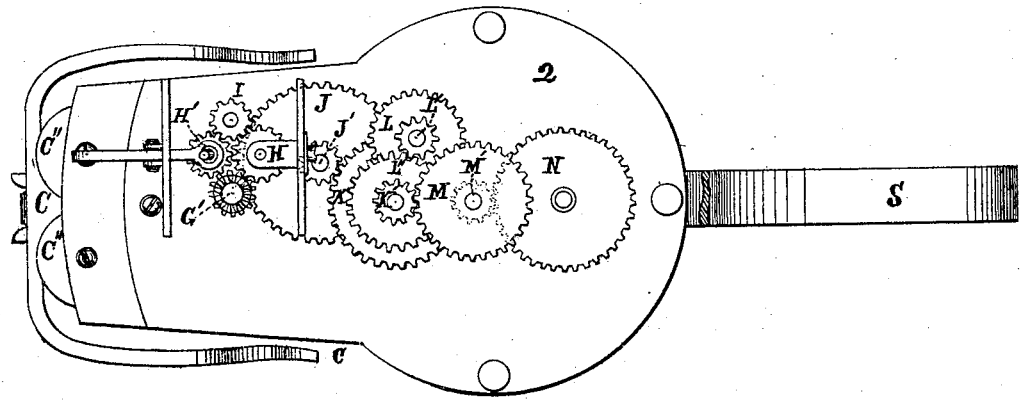
Figure 3:
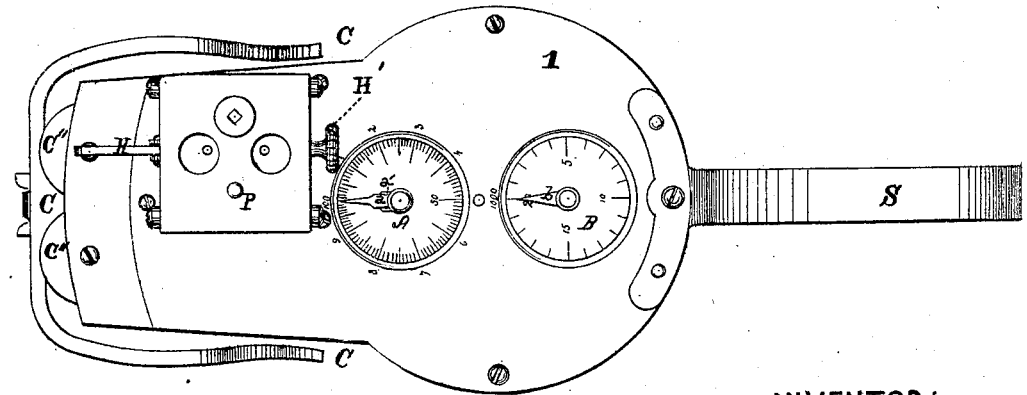

In the drawing, Figure 1 is view in elevation of the machine. Fig. 2 is plan of the machine with the top plate or dial-plate removed. Fig. 3 is plan with the dial-plate in position. Fig. 4 is plan of the lower story, or the machine with the top, second, and third plates removed. Fig. 5 is section in elevation of the two lower stories. Fig. 6 is a modification of the machine, by which one gear-wheel instead of six is used. Fig. 7 is view of Fig. 6 from the side. Fig. 8 is view of the gearing, shown in Figs. 6 and 7 from above, and also a view of the gage-bar.

My invention consists as follows: The lumber that is measured is tallied on the dials A and B, Fig. 3. The dial A is provided with two pointers or index-fingers, $a$ $a'$. The former moves once around the dial in measuring one hundred feet of lumber, inch-board measure, while the pointer $a'$ is moving from the origin to the figure 1, or one tenth of the distance. Therefore, when one thousand feet of lumber have been tallied the two pointers will stand upon the origin again, but the pointer $b$ on the dial B will have passed through one space. When two thousand feet have been measured the pointers on A will be upon the origin, and the pointer $b$ will have passed over another space on the dial B. The dial A is divided into one hundred equal spaces; each space, therefore, as regards the pointer $a$, corresponds to one foot of inch-board lumber. This is effected as follows: C, Fig. 1, is a hook, which, when the machine is placed on the flat side of a board at right angles to its length, catches upon the edge of the board. It has two arms, which, pressing on the board, prevent the hook from becoming detached. The hook C is attached to a chain, C', which, passing back, is coiled around a reel, D, and is fastened rigidly to its axis D'. This chain is kept coiled about the reel D through the action of the spiral ribbon-spring E in the second story of the machine. This spring E is attached at one end to a standard at $e$, and at the other end to the axis D' of the reel D. The chain C' locks into the teeth $f$ of the wheel F, and communicates motion to the latter. The axle of wheel F is hollow, and contains the coupling-block G, allowing the latter to slide freely up and down, but is prevented from turning around, except as the wheel F is turned, by the interposition of a loose key, $f'$, which sits into a loose-key groove in the hollow axle. When the instrument is placed upon a board the spring O is pressed against the coupling-block G, and the latter is thrown up into gear with the spindle G'. As the instrument is drawn across the board motion is communicated to the spindle G'; but as soon as the instrument has left the board the spring O flies down, the small spiral spring $g$ drives the coupling-block G out of gear, and the spindle G' ceases to move, although the chain C' may continue to draw out. The spindle G' is provided with different-sized pinions for the different lengths of lumber. These pinions or any one of them may be thrown into gear with one of the wheels H by means of the levers, shown at the left of Fig. 1, or by means of the sliding-blocks and set-screws, shown at the right of the spindle. Thus, if eighteen-feet lumber is to be measured or tallied, the left end of the middle lever is pressed up, and its gear-wheel geared into the adjacent pinion on the spindle G, the wheel H being always in gear with the long pinion I, Fig. 2, extending from the top of the machine to the top of the plate 2. Motion is thus communicated to I; thence to cog-wheel J, and by its center pinion J' to K, which moves the long pointer $a$. The pinion K' at the center of K drives the wheel L, whose center pinion L' works into the cog-wheel L'', and the latter moves the short pointer $a'$. K' works into M, and by its center pinion M drives the wheel N, which carries the pointer $b$. A wire brake, R, in the second story, presses against the base of the spindle G' and arrests its motion at the instant of uncoupling. Other devices may be used. Guide-pulleys C'', Fig. 2, keep the chain in position about the toothed wheel F.

In Fig. 6 is shown a variation of the machine, by which the stories may be reduced to two, and the machine be simplified. The spring E is placed within the reel D, and the second story is dispensed with. The spring O O is removed from the bottom, as shown in Fig. 5, and another spring, O O', is attached to the floor of the second story, and, passing under the head of the coupling-block G, passes down in front, and is provided with a button below. Its operation is then the same as before; but the instrument can lie flat on the board, the hook c can catch lower down, and, therefore, the arms, shown in Fig. 4, can be dispensed with. Instead of having the six or more wheels, shown in Fig. 1 at H H', &c., one may be used, Fig. 6, embraced in a forked handle, H'', which slides upon the rod P, gaged to the different lengths, as shown in Fig. 8, and retained at any point by the thumb-pawl, Fig. 8, dropping into the little grooves, shown in the rod P. The long pinion I, Fig. 7, being inclined to the spindle, the same wheel may be made to gear into all the pinions on the spindle. By a suitable latch and thumb-screw, shown at the top of Fig. 7, the long pinion I and the gear-wheel may be entirely detached from the spindle G'. By this variation the machine is reduced in height the distance of one story and the thickness of six gear-wheels, and may be easily carried in the pocket.

Having thus fully described my invention, what I claim is—

As a new article of manufacture, the lumber-measuring machine herein described, consisting of the spring-reel D, chain and hook C', &c., sprocket-wheel F, spindle G', having coupling-block G, operated by spring O, long pinion I, and gear-wheels H H', operating on the dials A B and points $a$ $a'$ $b$, substantially as and for the purpose set forth.

WM. S. FINLEY.

Witnesses:
CHARLES D. SMITH,
CHAS. P. CONGDON.